Kenison & McClary.
Let-Off Motion.

N°. 46,475.   Patented Feb. 21, 1865.

Witnesses,
H. E. Fisher.
Frederick Curtis.

Inventors.
Orin Kenison and A. J. McClary.
by their Attorney.
R. H. Eddy

# UNITED STATES PATENT OFFICE.

ORIN W. KENISON AND ANDREW J. McCLARY, OF LAWRENCE, MASS.

IMPROVEMENT IN FRICTION MECHANISM FOR THE WARP-BEAMS OF LOOMS.

Specification forming part of Letters Patent No. 46,475, dated February 21, 1865.

*To all whom it may concern:*

Be it known that we, ORIN W. KENISON and ANDREW J. McCLARY, of Lawrence, in the county of Essex and State of Massachusetts, have invented a new and useful or Improved Warp-Beam Friction Apparatus for Looms; and we do hereby declare the same to be fully described in the following specification and represented in the accompanying drawings, of which—

Figure 1:
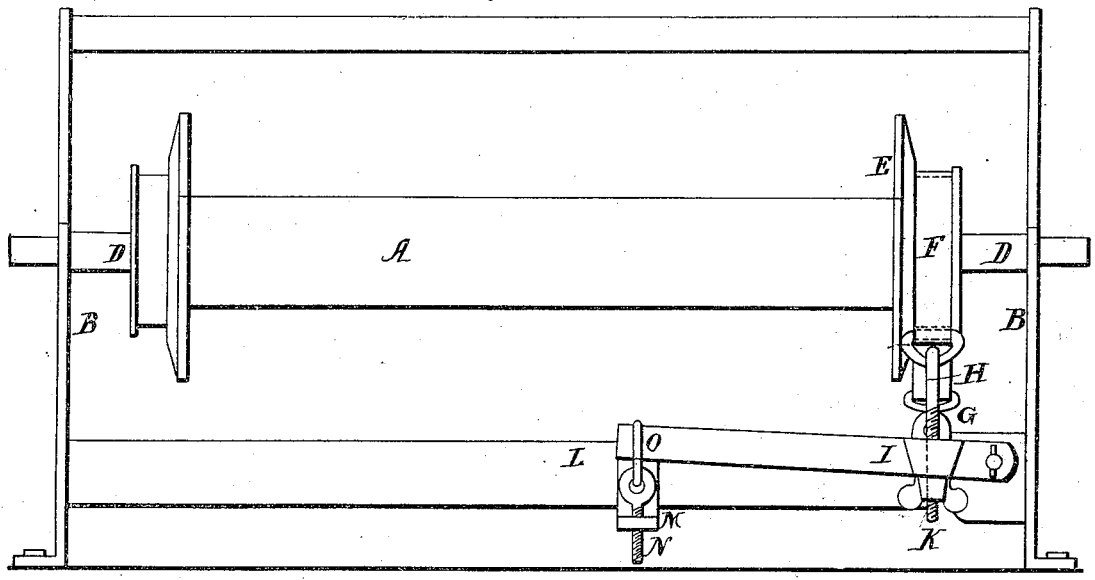
Figure 2:
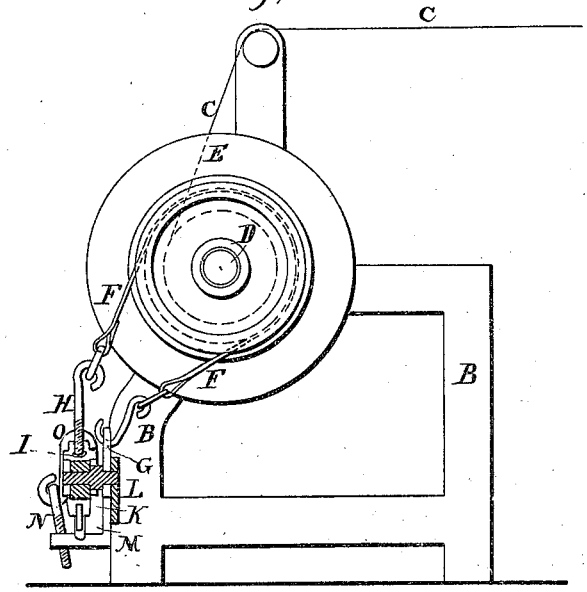

Figures 1 and 2 are front and end views of it as applied to the frame and warp-beam of a loom.

In the said drawings, A denotes the warp-beam; B, the loom-frame; C, the warps; D, the shaft of the warp-beam; E, the flange of the warp-beam; F, the friction-strap; G, the staple to which one end of the friction-strap is hooked. H is the screw or screw-rod to which the other extremity of the said strap is attached, such screw-rod going down through a lever, I, and being provided with a nut, K, arranged on it and underneath the lever. All these parts have been in use in their combination and arrangement as represented in the drawings, and when used a weight has been suspended from the longer arm of the lever I.

The beats of the lay during the process of weaving the weft into the warps will, when a weight is hung on the lever, cause a constant vibration of the lever in vertical directions. This vibration of the lever produces a consequent variation of the friction of the strap F on the warp-beam.

The purpose of our improvement or invention is to prevent the vibration of the lever I and the irregularities of friction of the strap resulting from such vibration, as such irregularities of friction cause the warps to be improperly delivered from the beam.

In carrying out our invention we combine with the lever I of the friction-strap F a device or mechanism which shall not only produce the requisite downward pressure on the lever, but at the same time be so controlled by the loom-frame or some other stationary object as to prevent the lever I from being vibrated in manner as described.

The said device or mechanism, as shown in the drawings, consists not only of a bracket, M, fastened firmly to and projecting from the girt L of the loom-frame B, but a screw, N, provided with a hook, O. The screw screws through the projecting part of the bracket M, and is jointed at its upper end to the hook which hooks upon the lever—that is to say, the lever is pressed down and caught under the hook, the screw N serving to adjust the said hook to the requisite altitude. In consequence of the stationary bracket the screw N and the hook O will maintain the lever I at its assumed altitude, and thus uniformity of friction of the strap F on the warp-beam will be preserved.

We do not claim the combination of a weight with the lever I and the friction-strap F, such weight being suspended from the longer arm of the lever.

What we claim as our invention is—

The combination of the stationary bracket M, the screw N, and hook O, or their mechanical equivalent or equivalents, with the lever I and the friction-strap F, when the latter are applied to the loom-frame and the warp-beam substantially as specified.

ORIN W. KENISON.
    ANDREW J. McCLARY.

Witnesses:
 SAML. M. NEWHALL,
 HENRY E. FISHER.